United States Patent [19]

Grawey

[11] 3,970,493

[45] July 20, 1976

[54] BELT REPLACEMENT METHOD FOR TUBE TIRES

[75] Inventor: Charles E. Grawey, Peoria, Ill.

[73] Assignee: Caterpillar Tractor Co., Peoria, Ill.

[22] Filed: Dec. 16, 1974

[21] Appl. No.: 533,420

Related U.S. Application Data

[63] Continuation of Ser. No. 309,237, Nov. 24, 1972, abandoned.

[52] U.S. Cl. .............................. 156/96; 152/176; 152/188; 152/209 R; 156/128 R; 425/38
[51] Int. Cl.² .......................................... B29H 5/04
[58] Field of Search .............. 156/95, 96, 110, 123, 156/126–130; 152/159, 172, 175, 176, 187, 188, 209 R, 324; 425/11, 17–25, 28, 38, 389, 504; 264/36, 315, 316, 326, DIG. 74

[56] References Cited
UNITED STATES PATENTS

| | | | |
|---|---|---|---|
| 1,707,014 | 3/1929 | Hopkinson | 156/96 |
| 2,609,026 | 9/1952 | Caballero | 156/96 |
| 3,107,713 | 10/1963 | Cushman | 156/128 |
| 3,392,072 | 7/1968 | Alderfer | 156/123 |
| 3,427,213 | 2/1969 | Alderfer | 156/129 |
| 3,606,921 | 9/1971 | Grawey | 156/117 X |

FOREIGN PATENTS OR APPLICATIONS

| | | | |
|---|---|---|---|
| 208,735 | 9/1959 | Australia | 156/128 |
| 866,405 | 4/1961 | United Kingdom | 156/96 |

*Primary Examiner*—Douglas J. Drummond
*Assistant Examiner*—John E. Kittle
*Attorney, Agent, or Firm*—Phillips, Moore, Weissenberger, Lempio & Strabala

[57] ABSTRACT

Replaceable tread or track belts on tube tire carcasses can be changed in the field and elsewhere by venting the pressure within the tube tire carcass, subsequently creating a partial vacuum within the tire carcass sufficient to cause it to commence collapsing, and then, while maintaining the vacuum constant in the carcass, physically depressing the periphery thereof at circumferentially spaced intervals to convert the outer circular surface of the carcass to a polygonal configuration that allows the circular belts to be conveniently changed.

3 Claims, 3 Drawing Figures

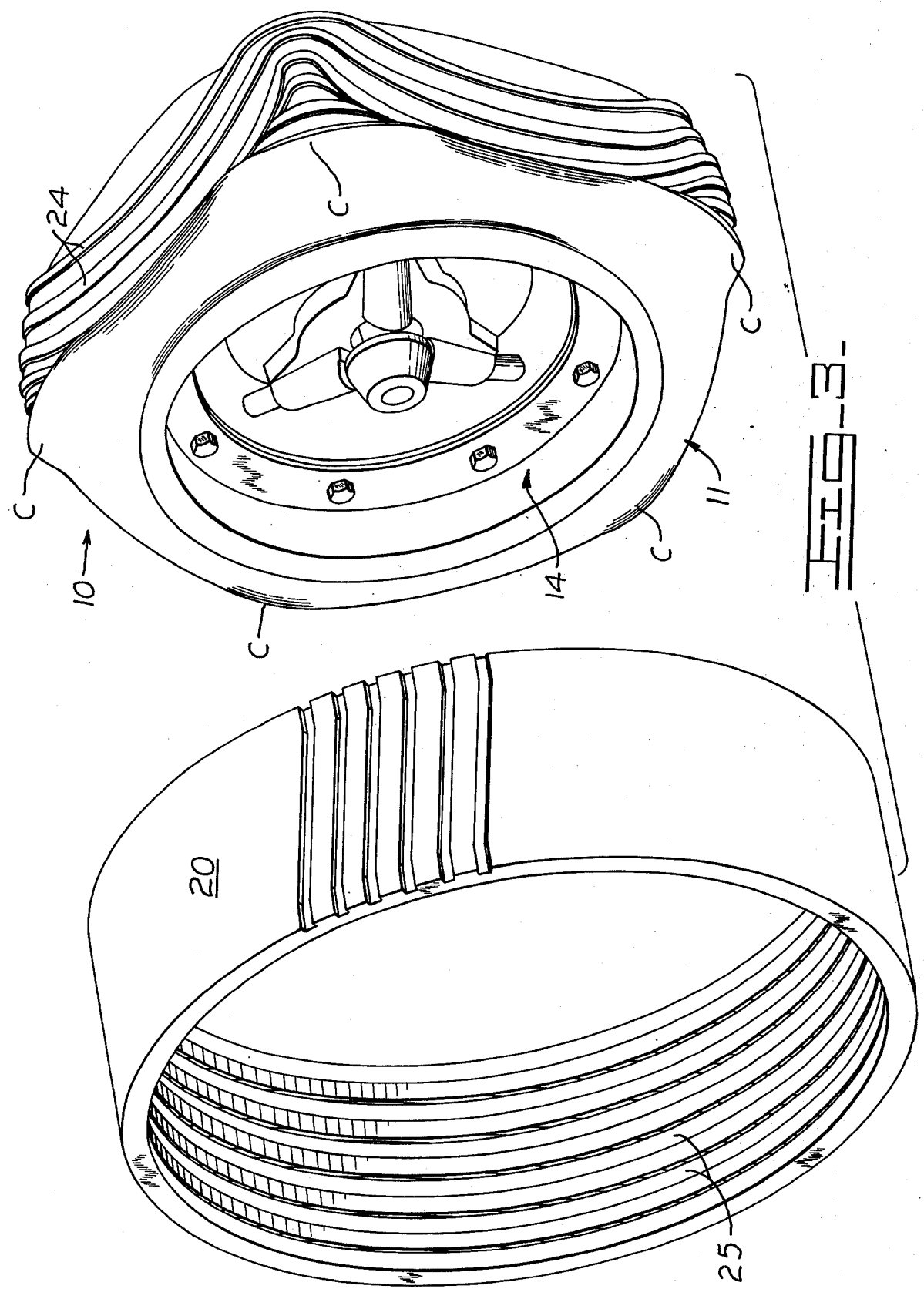

BELT REPLACEMENT METHOD FOR TUBE TIRES

This is a continuation, of Ser. No. 309,237, filed Nov. 24, 1972 now abandoned.

BACKGROUND OF THE INVENTION

Oval tube tires have been developed with carcasses that include a substantially flat crown on which replaceable circular tread and/or track belts are mounted. Such an oval tube tire is described fully in U.S. Pat. No. 3,606,921 which issued to C. E. Grawey and typically employs a plurality of circular ridges or ribs on the outer circular periphery of the carcass with matching circular grooves on the inner periphery of the circular belt that cooperatively mate with the ribs of the carcass when the belt is assembled on the flat crown. Because of this interlocking configuration between the tire carcass and the belt, the belt is very difficult to change or remove. Removal of the belt is further complicated by the fact the sidewalls of the tube carcass are stiff, by comparison to the central portion of the flat crown, so they tend to maintain their height even though the central portion of the flat crown of the carcass is collapsed inwardly thus freeing only the engagement of the ribs and grooves in the center of the crown while the top edges of the sidewalls remain engaged with the belt. Therefore, it can be appreciated that belt removal remains a problem because of the interference of the belt with the tops of the sidewalls of the carcass.

A manufacturing technique of drawing a vacuum inside a beaded tire is shown in U.S. Pat. No. 1,707,014, issued to Hopkinson wherein a convex crown is partially collapsed to fit an undersized tread on the outer periphery of this tire carcass. However, this manufacturing technique cannot be successfully applied to the oval tube tire for changing replaceable belts because of its substantially flat crown and stiff sidewalls, in comparison to the central portion of the crown.

In view of the above circumstances, it is an object of this invention to provide a simple and expedient method for removing and replacing tread or track belts on oval tube tire carcasses.

SUMMARY OF THE INVENTION

Replaceable tread and track belts can be conveniently changed on oval tube tire carcasses after they are suspended off the ground by the steps of partially evacuating the interior of the tube tire carcass until the carcass commences collapsing, stopping the evacuation and maintaining the vacuum therein substantially constant, and while physically displacing the circular periphery of the carcass at circumferentially spaced intervals to convert the outer surface thereof to a polygonal configuration, when viewed in elevation. Preferably the polygonal configuration should have five sides for best results.

BRIEF DESCRIPTION OF THE DRAWINGS

FIG. 3 is an exploded perspective of the tube tire carcass and a replaceable tread belt that can be easily and conveniently mounted on the polygon configured carcass.

DESCRIPTION OF THE PREFERRED METHOD

Figure 1:
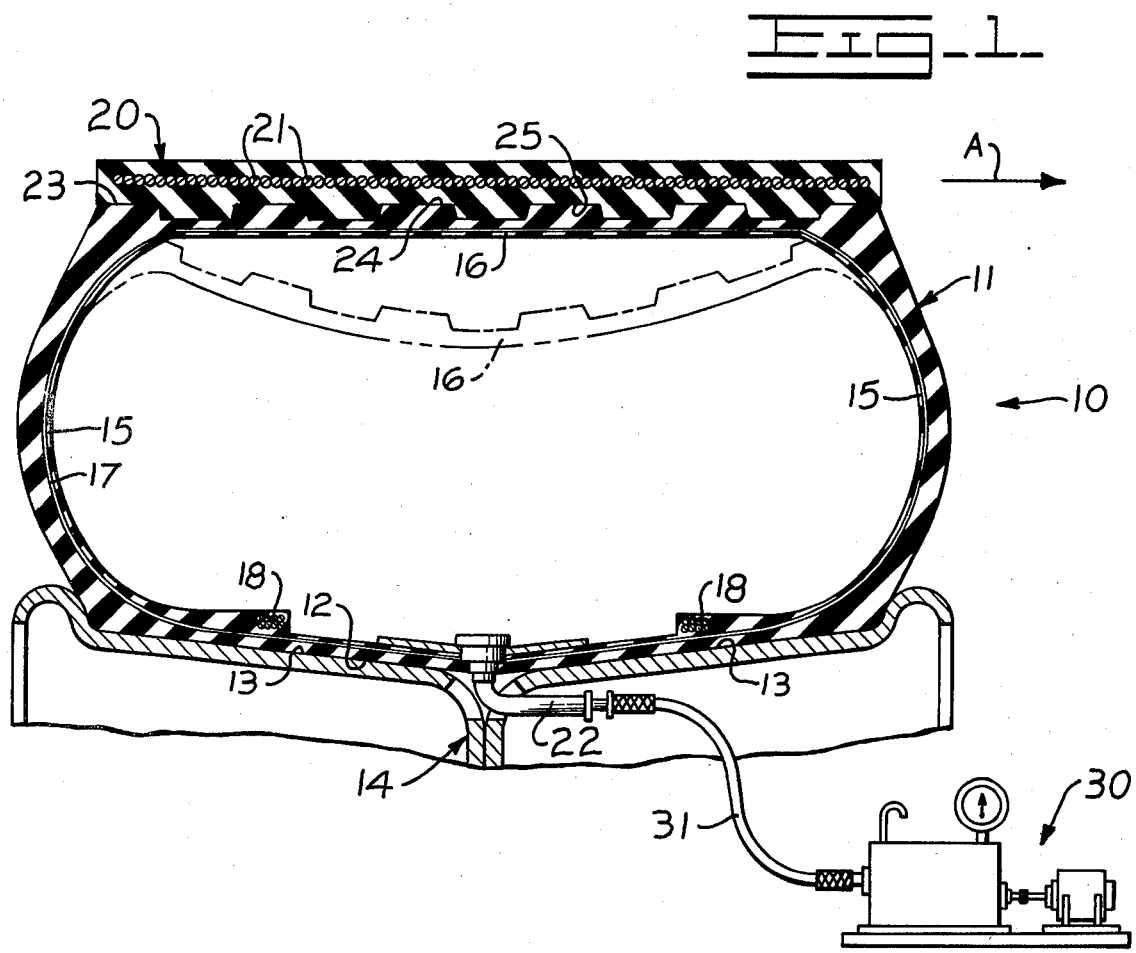
FIG. 1 is a top portion of a section through an oval tube tire with a replaceable tread belt and mounted on a rim with its valve stem connected to a vacuum pump.

Referring to FIG. 1, an oval tube tire 10 is illustrated in section. It includes a carcass 11 having a circular rim wall 12 situated on the cylindrical surfaces 13 of a split rim assembly 14, and curved sidewalls 15 extending from opposite edges of the rim wall to a substantially flat crown 16 that connects the top edges of the sidewalls together. Embedded in the elastomer forming the carcass are inextensible radial loops 17 of reinforcing that encircle the inextensible roll restraining hoops 18, one of which is located adjacent to the base of each sidewall.

Mounted on the flat crown 16 of the carcass 11 is a cylindrical, replaceable tread belt 20 (which could alternatively be a track belt) that includes inextensible reinforcing filaments 21 embedded in the elastomer that enables the belt to confine the carcass to its oval configuration when the tube tire carcass is pressurized through its valve stem 22, located in the rim wall 12 of the carcass. The stem extends through an aperture in the rim assembly 14, as illustrated in FIG. 1.

An interference fit 23 between the circular inner periphery of the belt 20 and the outer circular periphery of the carcass 11, includes a plurality of spaced raised circular ridges or ribs 24 on the periphery of the carcass with a plurality of matching grooves 25 formed in the inner periphery of the belt as shown, in FIGS. 1 and 3. As a result of this interlocking arrangement between the outer surface tube tire carcass and the belt, the belt is stabilized against tranverse slippage on the flat crown during heavy side loadings on the belt.

It is this interference fit 23 between the carcass 11 and the replaceable belt 20, along with the unique construction of the tube tire, that makes changing the belt difficult. For example, if a vacuum pump 30 is connected to the valve stem 22 through a hose 31 and the carcass partially evacuated, the principal result will be a partial collapse of the central portion of the flat crown 16, as shown in broken lines in FIG. 1. It is important to note that as this collapse occurs, the tops of the sidewalls move toward one another but are not appreciably reduced in height. Therefore, adequate clearance is not provided for belt removal. If the evacuation is continued, the central portion of the crown drops further toward the rim wall, as the tops of the sidewalls continue to roll toward one another. Thus if evacuation is sufficient to remove the belt in the direction of arrow A, the tops of the sidewall are so close together, that the ribs and grooves will be hopelessly mis-matched, and only on occasion will the belt be properly oriented on the carcass when the vacuum is released after placing a belt on a carcass in such a configuration. Further this drastic collapse of the tire structure can damage it structurally.

To overcome such difficulties the method of the instant invention can be employed. Generally, the convenience of easy, quick, belt fit and replacement can be achieved after the tire is suspended above the ground by partially collapsing the carcass 11, so the flat crown 16 thereof is in the approximate position shown by the broken lines in FIG. 1. This can be accomplished with vacuum pump 30 or alternatively with an air eductor valve (not shown) connected to the valve stem 22 and operated with a source of compressed air so air within the carcass is aspirated by the flow of compressed air through the eductor valve.

Figure 2:
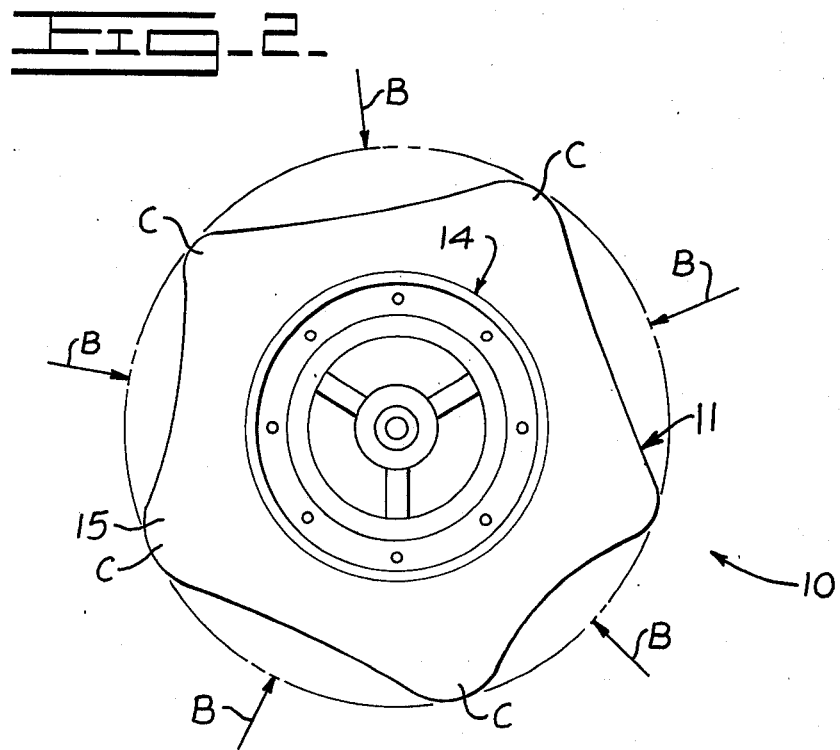
FIG. 2 is an elevation of the oval tube tire of FIG. 1, which has been converted to a polygonal configuration.

When the flat crown is in the approximate position shown in the cross section of FIG. 1 further evacuation of the carcass is stopped and the vacuum is then maintained constant. Thereafter, the circular periphery of the carcass 11 (which may or may not include a belt 20) is physically displaced, radially inwardly, at selected intervals about its periphery. This inward physical displacement of the carcass can be done manually by simultaneously or sequentially applying force to the periphery of the carcass at such intervals and is indicated by arrows B in FIG. 2. On larger size tires a mechanical assist may be required to produce the necessary physical displacement. As the peripheral surface of the carcass is displaced radially inwardly at selected locations, preferably at five equally spaced circumferential intervals, the outer configuration of the carcass will convert to a polygon-like shape, as illustrated in FIGS. 2 and 3. As this configuration is assumed lobes C are formed with portions of the crown of the carcass inwardly curved with respect to chord lines joining the apexes of adjacent lobes, as illustrated in FIGS. 2 and 3, which due to the bending axis across the apex of these lobes, will cause the ribs 24 to be aligned across the top of the crown so the grooves 25 in the inner periphery of the belt will be properly registered with the ribs when a belt is draped on the apexes of the several lobes. Thus, when the vacuum is released within the carcass, the orientation of the ribs and grooves is properly registered so they will mate with one another as the carcass returns to a circular shape.

With the five-sided or pentagon configuration shown in the drawings, the belt 20 can be easily assembled on the carcass even though it is usually designed with a diametrical interference fit, of the range of 3% undersize. This is true since the sum of the chords (i.e., the sides of the polygon) is substantially less than the inner circumference of the belt.

As the surface of the carcass is radially depressed at selected intervals the volume within the carcass stays constant, because it grows in volume in the areas of the lobes as the configuration change occurs. Therefore, the polygon configuration is stable until the vacuum is broken in the carcass.

In field tests the technique has greatly reduced the time necessary to change belts, and it also works well during the assembly of newly manufactured belts and tires of the type herein described.

In the above discussion the distortion of the outer surface of the tube tire carcass, when the carcass is evacuated, is simplified for purposes of clarity. In normal circumstances the distortion is somewhat more complex because a hollow geometric toroidal carcass configuration is involved, but this does not appreciably effect the method described. Further actual physical distortion will vary from carcass to carcass.

What is claimed is:

1. A method of placing replaceable tread and track belt having inextensible circumferential reinforcing members with a diametrical interference fit on a rim suspended pneumatic radially reinforced oval tube-tire carcass having a substantially flat belt mounting crown connected between the tops of its side walls wherein the crown and belt include interlocking circular ribs and grooves comprising the steps of:
    a. positioning said rim suspended oval tube-tire carcass above the ground, and without removing said tube-tire carcass from said rim;
    b. evacuating said tube-tire carcass until a partial inward collapse of its flat crown has occurred sufficient to convert said tube-tire carcass into a polygonal carcass configuration with more than three lobes and having portions of said flat crown inwardly curved with respect to chord lines joining apexes of adjacent lobes;
    c. draping a belt on said apexes of said lobes and aligning said belt with said interlocking circular ribs and grooves of said belt and said crown of said tube-tire carcass in registry at said lobes; and
    d. releasing said vacuum to allow said tube-tire carcass to expand into said belt as it returns to a circular configuration.

2. The method as claimed in claim 1 including the step of physically displacing the outer peripheral surface of said tube tire carcass radially inward to increase the number of lobes of said polygonal configuration.

3. The method as claimed in claim 2 wherein the step of displacing the outer peripheral surface of said tube-tire carcass radially inwardly is accomplished at five substantially equally spaced circumferential locations whereby a pentagon configuration of the tube-tire carcass is obtained.

* * * * *